(12) United States Patent
Zhang et al.

(10) Patent No.: US 11,249,174 B1
(45) Date of Patent: Feb. 15, 2022

(54) AUTOMATIC CALIBRATION METHOD AND SYSTEM FOR SPATIAL POSITION OF LASER RADAR AND CAMERA SENSOR

(71) Applicant: Tsinghua University, Beijing (CN)

(72) Inventors: Xinyu Zhang, Beijing (CN); Huaping Liu, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 17/336,342

(22) Filed: Jun. 2, 2021

(30) Foreign Application Priority Data

Jul. 27, 2020 (CN) .......................... 202010729645.4

(51) Int. Cl.
| | |
|---|---|
| *G01S 7/497* | (2006.01) |
| *G01S 17/89* | (2020.01) |
| *G01S 17/86* | (2020.01) |
| *G06T 5/20* | (2006.01) |
| *G06T 7/80* | (2017.01) |
| *G06T 7/13* | (2017.01) |
| *G06T 5/00* | (2006.01) |
| *G01S 7/481* | (2006.01) |

(52) U.S. Cl.
CPC ............ *G01S 7/497* (2013.01); *G01S 7/4814* (2013.01); *G01S 17/86* (2020.01); *G01S 17/89* (2013.01); *G06T 5/002* (2013.01); *G06T 5/20* (2013.01); *G06T 7/13* (2017.01); *G06T 7/80* (2017.01)

(58) Field of Classification Search
CPC ........ G01S 7/497; G01S 17/86; G01S 7/4814; G01S 17/89; G06T 7/80; G06T 7/13; G06T 5/002; G06T 5/20
See application file for complete search history.

(56) References Cited

U.S. PATENT DOCUMENTS

| | | | |
|---|---|---|---|
| 2019/0163989 A1* | 5/2019 | Guo | ........................ G08G 1/167 |
| 2021/0004610 A1* | 1/2021 | Huang | .................. B60W 60/00 |

FOREIGN PATENT DOCUMENTS

| | | | |
|---|---|---|---|
| CN | 110599541 A | * | 12/2019 |
| KR | 102145557 B1 | * | 8/2020 |

* cited by examiner

*Primary Examiner* — Luke D Ratcliffe
(74) *Attorney, Agent, or Firm* — Bayramoglu Law Offices LLC

(57) ABSTRACT

An automatic calibration method and system for spatial positions of a laser radar and a camera sensor is provided. The method includes: adjusting a spatial position of the laser radar relative to the camera sensor to obtain a plurality of spatial position relationships of the laser radar and the camera sensor; for a spatial position relationship, calculating a gray value of each laser radar point conforming to the line features after projection as a score, and accumulating scores of all laser radar points as a total score; traversing all the spatial position relationships to obtain a plurality of total scores; and selecting a spatial position relationship of the laser radar and the camera sensor corresponding to a highest total score from the plurality of total scores to serve as a calibrated position relationship of the laser radar and the camera sensor.

3 Claims, 2 Drawing Sheets

AUTOMATIC CALIBRATION METHOD AND SYSTEM FOR SPATIAL POSITION OF LASER RADAR AND CAMERA SENSOR

CROSS REFERENCE TO THE RELATED APPLICATIONS

This application is based upon and claims priority to Chinese Patent Application No. 202010729645.4, filed on Jul. 27, 2020, the entire contents of which are incorporated herein by reference.

TECHNICAL FIELD

The present invention relates to the field of multisensor calibration, and in particular to an automatic calibration method and system for spatial position of a laser radar and a camera sensor.

BACKGROUND

The multisensor calibration method is one of the key research points and difficulties in the field of unmanned driving. In the current sensor calibration algorithm, a manual calibration method is generally adopted, which usually requires a strict calibration environment, and the precision of the selected calibration object will also affect the calibration accuracy. Moreover, the spatial position relationship between the laser radar and the camera will gradually change during the operating process, so an automatic calibration method that can monitor the spatial position relationship online in real time and correct the accumulated errors in time is needed.

SUMMARY

The objective of the present invention is to provide an automatic calibration method and system for spatial position of a laser radar and a camera sensor, which can determine in real time whether the current spatial position of the laser radar and the camera is accurate and correct the spatial position error of the laser radar and the camera online in case of low accuracy. The method does not require human-designed calibration objects and can automatically collect information in the environment to calibrate the spatial position of the laser radar and the camera.

To achieve the above objective, embodiment 1 of the present invention provides an automatic calibration method for spatial position of a laser radar and a camera sensor, and the method includes:

adjusting the spatial position of a laser radar relative to a camera sensor, to obtain a plurality of spatial position relationships of the laser radar and the camera sensor;

for a spatial position relationship, screening out data conforming to line features from the laser radar point cloud data; screening data conforming to line features from the image data of the camera sensor; projecting the laser radar data conforming to line features onto a pixel coordinate system of a camera sensor, to calculate the gray value of a laser radar point conforming to line features after projection as the score, and accumulating the scores of all the laser radar points as the total score; and traversing all the spatial position relationships, to obtain a plurality of total scores; and selecting the spatial position relationship of the laser radar and the camera sensor corresponding to the highest total score from the plurality of total scores, to serve as the calibrated position relationship of the laser radar and the camera sensor.

As an improvement of the above method, the method further includes: judging whether the current spatial position of the laser radar and the camera sensor is accurate, specifically including:

screening out data conforming to line features from the laser radar point cloud data; and screening data conforming to line features from the image data of the camera sensor;

projecting the laser radar data conforming to line features onto the pixel coordinate system of a camera sensor, calculating the gray value of a laser radar point conforming to line features after projection, to accumulate the gray values of all the laser radar points and recording the sum as A; and accumulating the maximum gray values of all the laser radar points and recording the sum as B; and judging whether the value of A/B is greater than 0.9, if so, then the current spatial position of the laser radar and the camera sensor is accurate, otherwise, the current spatial position of the laser radar and the camera sensor is not accurate.

As an improvement of the above method, the adjusting the spatial position of the laser radar relative to the camera sensor specifically includes: fixing the camera sensor, and adjusting the spatial position of the laser radar according to any one or any combination of the following six degrees of freedom, wherein the six degrees of freedom include: moving along the x axis, moving along the y axis, moving along the z axis, rotating along the x axis, rotating along the y axis and rotating along the z axis, wherein x axis, y axis and z axis are three coordinate axes of a body coordinate system of a camera sensor.

As an improvement of the above method, the screening out data conforming to line features from the laser radar point cloud data is specifically as follows:

acquiring a plurality of beams of laser radar data, for the laser radar point in each beam, if the distance change of two adjacent laser radar points is larger than a threshold, then removing the farther laser radar data point, to screen out data conforming to line features.

As an improvement of the above method, the screening data conforming to line features from the image data of the camera sensor is specifically as follows:

acquiring image data collected by the camera sensor and converting to a grayscale map;

detecting the grayscale map with an edge detection algorithm to obtain an edge feature image;

filtering the edge feature image to leave vertical and horizontal features; and smoothing the edge feature image using Gaussian filter to obtain image data conforming to line features.

Embodiment 2 of the present invention provides an automatic calibration system of spatial position of a laser radar and a camera sensor, wherein the system includes: a laser radar, a camera sensor and a spatial position calibration module;

the spatial position calibration module is configured to: adjust the spatial position of a laser radar relative to a camera sensor, to obtain a plurality of spatial position relationships of the laser radar and the camera sensor; for a spatial position relationship, screen out data conforming to line features from the laser radar point cloud data; screen data conforming to line features from the image data of the camera sensor; project the laser radar data conforming to line features onto a pixel coordinate system of a camera sensor, to calculate the gray value of a laser radar point conforming to line features after projection as the score, and accumulate the scores of all the laser radar points as the total score; and traverse all the spatial position relationships, to obtain a plurality of total scores; and select the spatial position relationship of the laser radar and the camera sensor corresponding to the highest total score from the plurality of total scores, to serve as the calibrated position relationship of the laser radar and the camera sensor.

As an improvement of the above system, the system further includes: a judgment module, configured to judge whether the current spatial position of the laser radar and the camera sensor is accurate, wherein the specific implementation process of the module is as follows:

screening out data conforming to line features from the laser radar point cloud data; and screening data conforming to line features from the image data of the camera sensor;

projecting the laser radar data conforming to line features onto the pixel coordinate system of a camera sensor, calculating the gray value of a laser radar point conforming to line features after projection, to accumulate the gray values of all the laser radar points and recording the sum as A; and accumulating the maximum gray values of all the laser radar points and recording the sum as B; and judging whether the value of A/B is greater than 0.9, if so, then the current spatial position of the laser radar and the camera sensor is accurate, otherwise, the current spatial position of the laser radar and the camera sensor is not accurate.

As an improvement of the above system, the adjusting the spatial position of the laser radar relative to the camera sensor specifically includes: fixing the camera sensor, and adjusting the spatial position of the laser radar according to any one or any combination of the following six degrees of freedom, wherein the six degrees of freedom include: moving along the x axis, moving along the y axis, moving along the z axis, rotating along the x axis, rotating along the y axis and rotating along the z axis, wherein x axis, y axis and z axis are three coordinate axes of a body coordinate system of a camera sensor.

As an improvement of the above system, the screening out data conforming to line features from the laser radar point cloud data is specifically as follows:

acquiring a plurality of beams of laser radar data, for the laser radar point in each beam, if the distance change of two adjacent laser radar points is larger than a threshold, then removing the farther laser radar data point, to screen out data conforming to line features.

As an improvement of the above system, the screening data conforming to line features from the image data of the camera sensor is specifically as follows:

acquiring image data collected by the camera sensor and converting to a grayscale map;

detecting the grayscale map with an edge detection algorithm to obtain an edge feature image;

filtering the edge feature image to leave vertical and horizontal features; and smoothing the edge feature image using Gaussian filter to obtain image data conforming to line features.

Compared with the prior art, the present invention has the following advantages:

1. The method of the present invention can automatically complete feature extraction with no need of manually designing calibration plates and without relying on a specific environment, thereby avoiding the limitation of calibration scenarios and enhancing the applicability and convenience of the calibration method.

2. The method of the present invention is real-time online calibration that can automatically correct errors in the use process and avoid the impact of accumulated errors in the use process on the system; and 3. The point cloud linear feature and image linear feature screening method of the present invention can filter non-line features and improve automatic calibration precision.

DETAILED DESCRIPTION OF THE EMBODIMENTS

The technical solutions of the present invention are described in detail below in combination with the accompanying drawings and specific embodiments.

Embodiment 1

Figure 1:
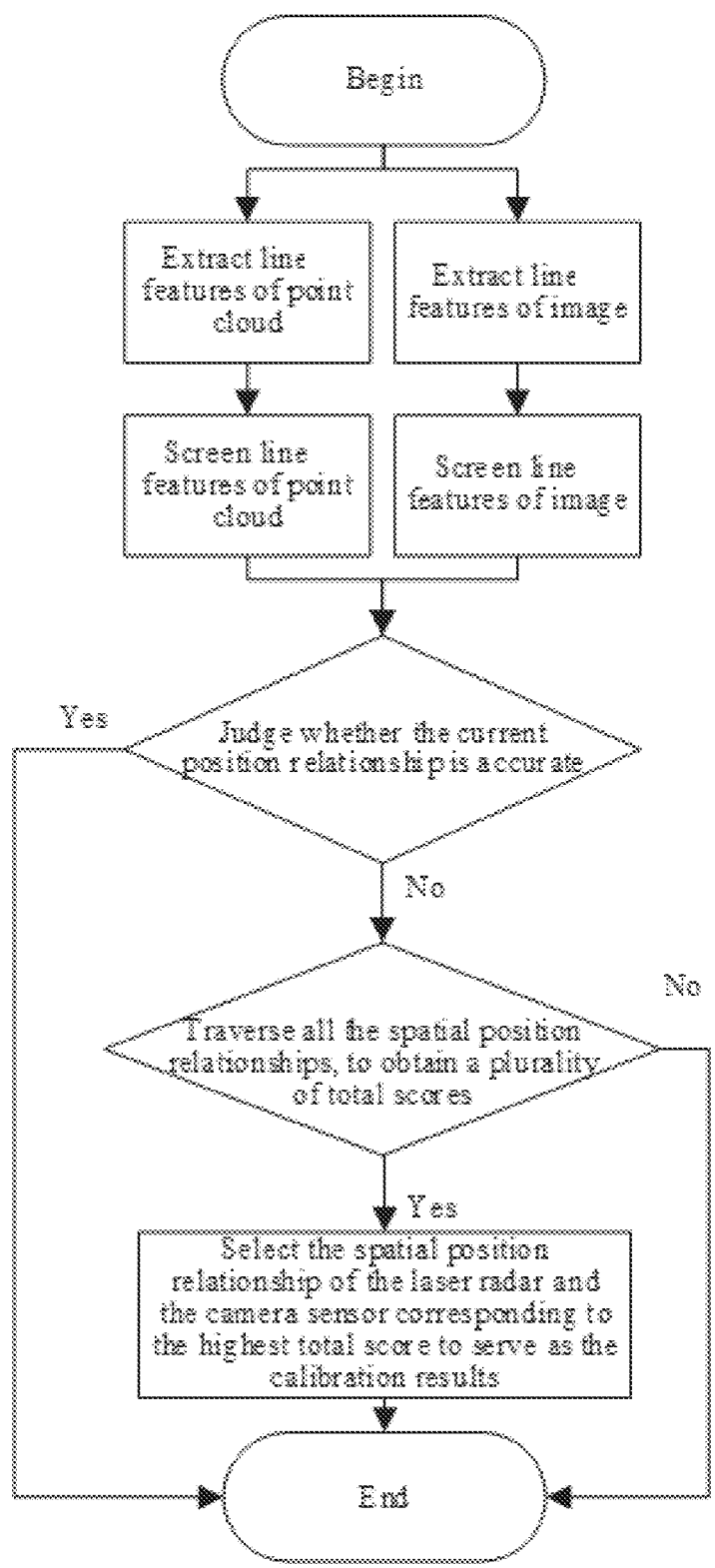
FIG. 1 is a flow chart of an automatic calibration method of the spatial position of a laser radar and a camera sensor of the present invention.
Figure 2:
FIG. 2 is a schematic diagram of line features of a point cloud.

As shown in FIG. 1, embodiment 1 of the present invention provides an automatic calibration method for position relation of a laser radar and a camera sensor, and the method can correct the accumulated position errors of a multisensor system. The laser radar refers to a three-dimensional radar system that emits a laser beam to detect a characteristic quantity of a target position, and the camera sensor refers to a device that uses optical imaging principles to form an image, and the method includes the following steps:

Step 101) judging whether the current spatial position of the laser radar and the camera sensor is accurate, specifically including:

screening out data conforming to line features from the laser radar point cloud data, specifically including:

acquiring a plurality of beams of laser radar data, for the laser radar point in each beam, if the distance change of two adjacent laser radar points is larger than a threshold, then removing the farther laser radar data point, to screen out data conforming to line features, as shown in FIG. 2.

Figure 3:
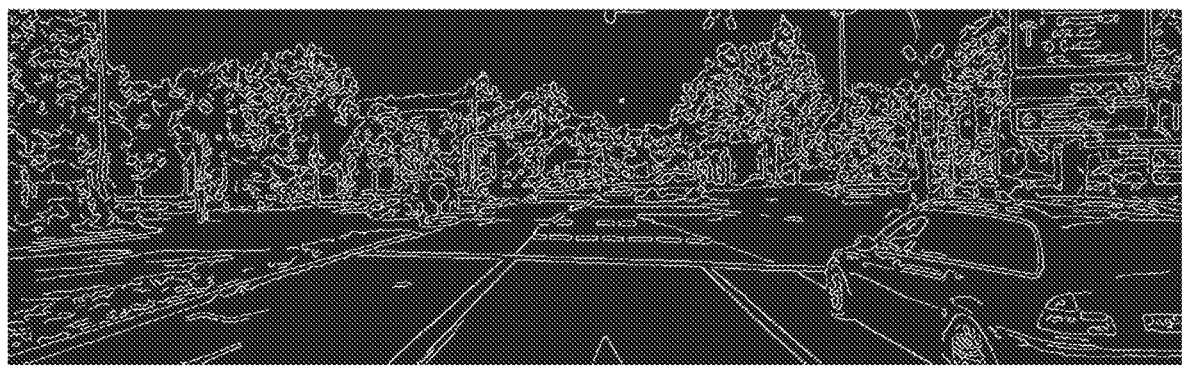
FIG. 3 is a schematic diagram of line features of an image.

The screening data conforming to line features from the image data of the camera sensor specifically includes:

acquiring image data collected by the camera sensor and converting to a grayscale map;

detecting the grayscale map with an edge detection algorithm to obtain an edge feature image;

filtering the edge feature image to leave vertical and horizontal features; and smoothing the edge feature image using Gaussian filter to obtain image data conforming to linear feature, as shown in FIG. 3.

projecting the laser radar data conforming to line features onto the pixel coordinate system of a camera sensor, calculating the gray value of a laser radar point conforming to line features after projection, to accumulate the gray values of all the laser radar points and recording the sum as A; and accumulating the maximum gray values of all the laser radar points and recording the sum as B; and judging whether the value of A/B is greater than 0.9, if so, then the current spatial position of the laser radar and the camera sensor is accurate, otherwise, the current spatial position of the laser radar and the camera sensor is not accurate.

Step 102) adjusting the spatial position of the laser radar relative to the camera sensor, to obtain a plurality of spatial position relationships of the laser radar and the camera sensor;

the adjusting the spatial position of the laser radar relative to the camera sensor specifically includes: fixing the camera sensor, and adjusting the spatial position of the laser radar according to any one or any combination of the following six degrees of freedom, wherein the six degrees of freedom include: moving along the x axis, moving along the y axis, moving along the z axis, rotating along the x axis, rotating along the y axis and rotating along the z axis, wherein x axis, y axis and z axis are three coordinate axes of a body coordinate system of a camera sensor.

Step 103) For a spatial position relationship, screening out data conforming to line features from the laser radar point cloud data; screening data conforming to line features from the image data of the camera sensor; projecting the laser radar data conforming to line features onto a pixel coordinate system of a camera sensor, to calculate the gray value of a laser radar point conforming to line features after projection as the score, and accumulating the scores of all the laser radar points as the total score; and traversing all the spatial position relationships, to obtain a plurality of total scores; and Step 104) selecting the spatial position relationship of the laser radar and the camera sensor corresponding to the highest total score from the plurality of total scores, to serve as the calibrated position relationship of the laser radar and the camera sensor.

The point cloud and image linear feature extraction of the present invention does not depend on a specific environment. The point cloud and image linear feature screening of the present invention is completed automatically with no need of manual screening.

Embodiment 2

Embodiment 2 of the present invention provides an automatic calibration system of spatial position of a laser radar and a camera sensor, wherein the system includes: a laser radar, a camera sensor and a spatial position calibration module;

the spatial position calibration module is configured to: adjust the spatial position of a laser radar relative to a camera sensor, to obtain a plurality of spatial position relationships of the laser radar and the camera sensor; for a spatial position relationship, screen out data conforming to line features from the laser radar point cloud data; screen data conforming to line features from the image data of the camera sensor; project the laser radar data conforming to line features onto a pixel coordinate system of a camera sensor, to calculate the gray value of a laser radar point conforming to line features after projection as the score, and accumulate the scores of all the laser radar points as the total score; and select the spatial position relationship of the laser radar and the camera sensor corresponding to the highest total score from the plurality of total scores, to serve as the calibrated position relationship of the laser radar and the camera sensor.

Embodiment 3

Figure 4:
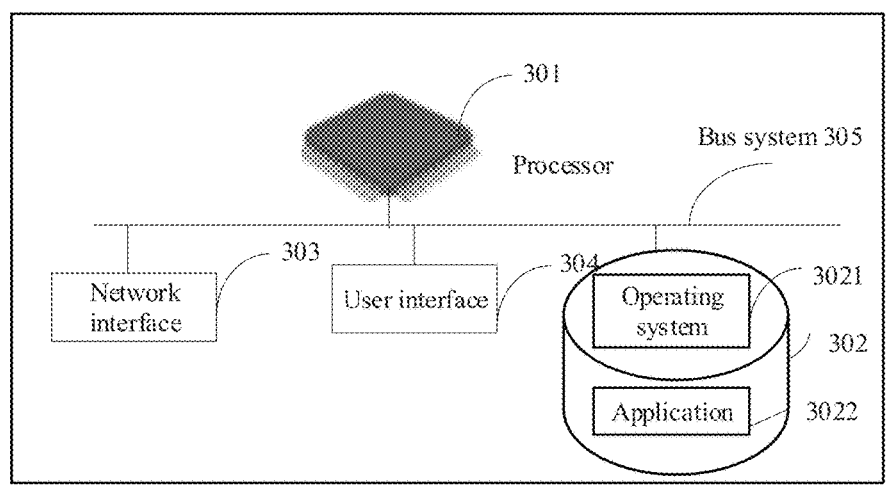
FIG. 4 is a structural schematic diagram of a mobile terminal of the present invention.

As shown in FIG. 4, embodiment 3 of the present invention provides a terminal device, including: at least one processor 301, a memory 302, at least one network interface 303, and a user interface 304. Various components are coupled together via a bus system 305. It is understood that, the bus system 305 is configured to realize connection communication between these components. The bus system 305 further includes a power bus, a control bus, and a status signal bus in addition to a data bus. However, for clarity, the various buses are all labeled as a bus system 305 in the FIG. 4.

Wherein the user interface 304 may include a display, a keyboard, or a clicking device (e.g., a mouse, a track ball, a tactile pad, or a touch screen, etc.).

It can be understood that the memory 302 in the embodiments of the present disclosure may be volatile memory or non-volatile memory, or may include both volatile and non-volatile memories. Among these memories, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By exemplary but not restrictive instructions, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), and Direct Rambus RAM (DRRAM). The memories 302 described herein are intended to include, but are not limited to, these and any other suitable types of memories.

In some embodiments, the memory 302 stores the following elements, executable modules or data structures, or their subsets, or their extended sets: the operating system 3021 and the application 3022.

Wherein, the operating system 3021, which contains various system programs, such as a framework layer, a core library layer, a driver layer, and the like, is configured to implement various basic services and handle hardware-based tasks. The application program 3022, which contains various applications, such as Media Player, Browser and the like, is configured to implement various application businesses. Programs to implement methods of embodiments of the present disclosure may be included in the application 3022.

In embodiments of the present disclosure, by calling a program or instruction stored in the memory 302, specifically, which may be a program or an instruction stored in application 3022, the processor 301 is configured to:

implement the step of the method of embodiment 1.

The method of embodiment 1 may be applied in or implemented by a processor 301. The processor 301 may be an integrated circuit chip with signal processing capabilities. In the implementation process, the steps of the above method may be accomplished by integrated logic circuitry in hardware or instructions in the form of software in the processor 301. The above processor 301 may be a general purpose processor, a Digital Signal Processor (DSP), an Application Specific Integrated Circuit (ASIC), a Field Programmable Gate Array (FPGA) or other programmable logic devices, discrete gates or transistor logic devices, and discrete hardware components. The methods, steps, and logical block diagrams disclosed in embodiment 1 can be implemented or performed. The general purpose processor may be a microprocessor or the processor may also be any conventional processor, etc. The steps of the method disclosed in combination with embodiment 1 may be directly embodied as being executed by the hardware decode processor or being executed with a combination of hardware and software modules in the decode processor. The software module can be arranged in a random memory, a flash memory, a read-only memory, a programmable read-only memory or an electrically rewritable programmable memory, a register and other storage media well established in the art. The storage medium is located in the memory 302, and the processor 301 reads the information in the memory 302 and completes the steps of the above method in combination with its hardware.

It will be appreciated that, these embodiments described in the present invention may be implemented in hardware, software, firmware, middleware, microcode, or combinations thereof. For hardware implementations, the processing unit may be implemented in one or more Application Specific Integrated Circuits (ASICs), Digital Signal Processing (DSP), DSP Devices (DSPDs), Programmable Logic Devices (PLDs), Field-Programmable Gate Arrays (FPGAs), general purpose processors, controllers, microcontrollers, microprocessors, other electronic unit for performing the functions described in the present application, or a combination thereof.

For software implementation, the technology of the present invention can be implemented by executing functional modules of the present invention (e.g., procedures, functions, etc.). The software code may be stored in the memory and executed by the processor. The memory may be implemented in the processor or outside the processor.

Embodiment 4

Embodiment 4 of the present invention provides a non-volatile storage medium for storing a computer program. When the computer program is executed by the processor, various steps in the above method embodiment I can be achieved.

Finally, it should be noted that the above embodiments are merely used for illustrating rather than limiting the technical solutions of the present invention. Although the present invention is described in detail with reference to the embodiments, those skilled in the art should understand that all the modifications or equivalent substitutions made to the technical solution of the present invention do not depart from the spirit and scope of the technical solution of the present invention, and should all fall within the scope of the claims of the present invention.

What is claimed is:

1. An automatic calibration method for spatial positions of a laser radar and a camera sensor, comprising:
    adjusting a spatial position of the laser radar relative to the camera sensor to obtain a plurality of spatial position relationships of the laser radar and the camera sensor;
    for a spatial position relationship, screening out data conforming to line features from laser radar point cloud data, screening out data conforming to the line features from image data of the camera sensor, projecting laser radar data conforming to the line features onto a pixel coordinate system of the camera sensor to calculate a gray value of a laser radar point conforming to the line features after projection as a score, and accumulating scores of all laser radar points as a total score;
    traversing all the spatial position relationships to obtain a plurality of total scores; and
    selecting a spatial position relationship of the laser radar and the camera sensor corresponding to a highest total score from the plurality of total scores to serve as a calibrated position relationship of the laser radar and the camera sensor;
    wherein, the step of screening out data conforming to the line features from the laser radar point cloud data specifically comprises:
        acquiring a plurality of beams of laser radar data; and
        for laser radar points in each beam, when a distance change of two adjacent laser radar points is larger than a threshold, removing a farther laser radar data point to screen out data conforming to line features;
    wherein, the step of screening out data conforming to the line features from the image data of the camera sensor specifically comprises:
        acquiring image data collected by the camera sensor and converting the image data to a grayscale map;
        detecting the grayscale map with an edge detection algorithm to obtain an edge feature image;
        filtering the edge feature image to leave vertical and horizontal features; and
    smoothing the edge feature image using Gaussian filter to obtain the image data conforming to the line features;
    wherein, the step of adjusting the spatial position of the laser radar relative to the camera sensor specifically comprises:
    fixing the camera sensor, and
    adjusting the spatial position of the laser radar according to any one or any combination of the following six degrees of freedom,
        wherein the six degrees of freedom comprise: moving along an x axis, moving along a y axis, moving along a z axis, rotating along the x axis, rotating along the y axis and rotating along the z axis, wherein the x axis, the y axis and the z axis are three coordinate axes of a body coordinate system of the camera sensor.

2. An automatic calibration system for spatial positions of a laser radar and a camera sensor, comprising: the laser radar, the camera sensor and a spatial position calibration module;
    the spatial position calibration module is configured to:
    adjust a spatial position of the laser radar relative to the camera sensor to obtain a plurality of spatial position relationships of the laser radar and the camera sensor;
    for a spatial position relationship, screen out data conforming to line features from laser radar point cloud data, screen out data conforming to the line features from image data of the camera sensor, project laser radar data conforming to the line features onto a pixel coordinate system of the camera sensor to calculate a gray value of a laser radar point conforming to the line features after projection as a score, and accumulate scores of all laser radar points as a total score;
    traverse all the spatial position relationships to obtain a plurality of total scores; and
    select a spatial position relationship of the laser radar and the camera sensor corresponding to a highest total score from the plurality of total scores to serve as a calibrated position relationship of the laser radar and the camera sensor;
    wherein, the step of screening out data conforming to the line features from the laser radar point cloud data specifically comprises:
        acquiring a plurality of beams of laser radar data; and
        for laser radar points in each beam, when a distance change of two adjacent laser radar points is larger than a threshold, removing a farther laser radar data point to screen out data conforming to line features;

wherein, the step of screening out data conforming to the line features from the image data of the camera sensor specifically comprises:
  acquiring image data collected by the camera sensor and converting the image data to a grayscale map;
  detecting the grayscale map with an edge detection algorithm to obtain an edge feature image;
  filtering the edge feature image to leave vertical and horizontal features; and
  smoothing the edge feature image using Gaussian filter to obtain the image data conforming to the line features;
wherein, the step of adjusting the spatial position of the laser radar relative to the camera sensor specifically comprises:
  fixing the camera sensor, and
  adjusting the spatial position of the laser radar according to any one or any combination of the following six degrees of freedom,
wherein the six degrees of freedom comprise: moving along an x axis, moving along a y axis, moving along a z axis, rotating along the x axis, rotating along the y axis and rotating along the z axis, wherein the x axis, the y axis and the z axis are three coordinate axes of a body coordinate system of the camera sensor.

3. An automatic calibration method for spatial positions of a laser radar and a camera sensor, comprising:
  screening out laser radar data conforming to line features from a laser radar point cloud data; and screening data conforming to line features from image data of a camera sensor;
  projecting the laser radar data conforming to line features onto a pixel coordinate system of the camera sensor, calculating gray values of a plurality of laser radar points conforming to line features after projection to accumulate the gray values of all the laser radar points conforming to line features after projection and recording the sum as A; and accumulating maximum gray values of all the laser radar points conforming to line features after projection and recording the sum as B; and
  judging whether the value of A/B is greater than 0.9, if so, then the spatial position of each of the laser radar and the camera sensor is accurate, otherwise, the spatial position of each of the laser radar and the camera sensor is not accurate;
  adjusting the spatial position of the laser radar relative to the camera sensor to obtain a plurality of spatial position relationships between the laser radar and camera sensor;
  for a spatial position relationship, screening out laser radar data conforming to line features from the laser radar point cloud data; screening data conforming to line features from the image data of the camera sensor; projecting the laser radar data conforming to line features onto a pixel coordinate system of a camera sensor to calculate each gray value of each laser radar point of a plurality of laser radar points conforming to line features after projection as a score, and accumulating the scores of all the laser radar points as a total score; and traversing all the spatial position relationships to obtain a plurality of total scores; and
  selecting the spatial position relationship of the laser radar and the camera sensor corresponding to a highest total score from the plurality of total scores, to serve as a calibrated position relationship of the laser radar and the camera sensor.

* * * * *